United States Patent [19]
Nestelle

[11] Patent Number: 6,090,428
[45] Date of Patent: Jul. 18, 2000

[54] SPREADABLE PROTEIN COMPOSITIONS

[75] Inventor: Lynda Nestelle, Troutdale, Oreg.

[73] Assignees: Joseph Ventura Rancho, Santa Fe; John Wise, San Marcos, both of Calif.

[21] Appl. No.: 08/881,905

[22] Filed: Jun. 25, 1997

[51] Int. Cl.[7] .................................. A23J 3/14; A23J 3/08
[52] U.S. Cl. ..................... 426/538; 426/629; 426/632; 426/634; 426/580; 426/657
[58] Field of Search .................... 426/538, 629, 426/632, 634, 580, 657

[56] References Cited

U.S. PATENT DOCUMENTS

| | | |
|---|---|---|
| 3,947,599 | 3/1976 | Mitchell, Jr. . |
| 4,113,889 | 9/1978 | Baxley . |
| 4,544,565 | 10/1985 | Barnett . |
| 4,642,240 | 2/1987 | Barnett et al. . |
| 4,828,868 | 5/1989 | Lasdon .................................. 426/633 |
| 4,871,570 | 10/1989 | Barnett et al. . |
| 4,910,031 | 3/1990 | Budd ........................................ 426/96 |
| 4,913,921 | 4/1990 | Schroeder ............................. 426/321 |
| 4,992,279 | 2/1991 | Palmer ................................... 426/548 |
| 5,021,249 | 6/1991 | Bunick ..................................... 426/96 |
| 5,034,242 | 7/1991 | Lasdon et al. . |
| 5,045,336 | 9/1991 | Lindley et al. . |
| 5,094,862 | 3/1992 | Bunick ..................................... 429/96 |
| 5,232,735 | 8/1993 | Kurtz ..................................... 426/536 |
| 5,366,750 | 11/1994 | Morano .................................. 426/572 |
| 5,366,754 | 11/1994 | Rudan et al. . |
| 5,529,801 | 6/1996 | Morano .................................. 426/572 |
| 5,591,477 | 1/1997 | Boyce et al. . |
| 5,603,979 | 1/1997 | Lasdon .................................. 426/633 |
| 5,631,038 | 5/1997 | Kurtz ..................................... 426/536 |
| 5,709,896 | 1/1998 | Hartigan ................................ 426/573 |
| 5,723,164 | 3/1998 | Morano .................................. 426/572 |
| 5,876,781 | 3/1999 | Lasdon .................................. 426/633 |

FOREIGN PATENT DOCUMENTS

| | | |
|---|---|---|
| 1 208 966 | 9/1986 | Canada . |
| 2 142 526 | 2/1995 | Canada . |
| 351973 | 1/1990 | European Pat. Off. . |
| 0 630 583 A2 | 12/1994 | European Pat. Off. . |
| 0 630 583 A3 | 12/1994 | European Pat. Off. . |
| 2 180 534 | 4/1987 | United Kingdom . |

*Primary Examiner*—Carolyn Paden
*Attorney, Agent, or Firm*—Fish & Richardson P.C.

[57] ABSTRACT

The present invention provides a spreadable nonfat protein composition comprising an edible nonfat solid, a sweetener in the range of about 40% to 80% percent of total weight of the composition and a sweetness inhibiting amount of the sweetness inhibiting agent (±)2-(4-methoxyphenoxy)-propanoate or salts thereof. The spreadable nonfat protein composition can be used to create a variety of nonfat edible foodstuffs.

18 Claims, No Drawings

SPREADABLE PROTEIN COMPOSITIONS

BACKGROUND OF THE INVENTION

1. Field of the Invention

This invention relates to an edible foodstuff, more specifically a spreadable nonfat protein composition that is shelf stable.

2. Description of Related Art

Heart disease continues to be a leading health problem in modern societies. The typical modem diet contains large quantities of saturated fat and cholesterol derived from the high amount of fat found in typical processed foods. A diet with an increased intake of fat can raise total blood cholesterol above recommended levels and a high fat intake has also been demonstrated to raise the level of the deleterious form of cholesterol known as low-density lipoprotein (LDL). Total blood cholesterol levels above 200 mg/dl and those in which LDL is abnormally elevated significantly increase one's health risk contributing to coronary heart disease and decreased lifespan. By decreasing the intake of dietary fat, total cholesterol and LDL cholesterol levels can be reduced thereby improving health and increasing longevity.

One means to maintain recommended levels of dietary cholesterol and fat is to eat fewer fatty foods. Eating less fat is also the best way to lose body fat. However, many consumers believe that following a healthy low-fat diet means a lifestyle of self-deprivation because nonfat or lowfat foods are perceived to be unappealing. Accordingly, it would be advantageous to provide a food that combined the consumer appeal of high fat foods (i.e., qualities such as taste and texture) without the high fat content. Nonfat or low-fat foods which are not perceived as bland or boring would be beneficial as part of a healthy, reduced fat diet. It would be highly desirable to provide a non- or low-fat protein composition for use in a variety of foodstuffs having a total fat content about 1% to about less than 10%. Additionally, it would be preferably to have such a composition be spreadable given the large number of consumer foodstuffs having this characteristic.

SUMMARY OF THE INVENTION

The present invention is directed to edible foodstuffs prepared from a spreadable nonfat protein composition comprising an edible nonfat solid, a sweetener in the range of about 40 to 80 percent of total weight of the composition and a sweetness inhibiting amount of a sweetness inhibiting agent.

It is a further object of the present invention to produce the spreadable nonfat protein composition by increasing the amount of sweetener used in the composition while preventing the perception of excessive sweetness through the use of the sweetness inhibiting agent of the formula (±)2-(4-methoxyphenoxy)-propanoate.

It is a further object of the present invention to produce a variety of spreadable nonfat foodstuffs comprising the spreadable nonfat protein composition of the application. Examples include, but are not restricted to, such spreadable nonfat foodstuffs as: peanut butter, butter, cheese spreads, dressings and dips.

It is a further object of the present invention to produce spreadable nonfat foodstuffs having less than 7% moisture content thus rendering them shelf stable with the addition of a preservative spreadable nonfat foodstuffs having less than 3% moisture content render them shelf stable without the need for preservatives.

It is a further object of the present invention to eliminate the amount of fat normally present in spreadable nonfat foodstuffs while preserving the flavor and texture of regular fat spreadable foodstuffs. It is a further object of the present invention to produce spreadable nonfat foodstuffs with the attributes and qualities of full fat spreadable foodstuffs while maintaining a non- or low fat character.

It is also the object of the present invention to produce spreadable nonfat foodstuffs that are nutritionally equivalent to conventional spreadable fat foodstuffs.

A further object of the present invention is to produce a nonfat peanut butter using defatted peanut flour which closely approximates conventional peanut butter in texture and has a rich roasted peanut flavor, the flavor being retained over a normal shelf life, either when refrigerated or when stored.

Other features and advantages of the invention will become apparent to those skilled in the art upon review of the following detailed description and claims.

DETAILED DESCRIPTION OF THE INVENTION

Before the present compositions and formulations are described, it is to be understood that this invention is not limited to the particular compositions and formulations described herein, as such compositions and formulations may, of course, vary. It is also to be understood that the terminology used herein is for the purpose of describing particular embodiments only, and is not intended to limit the scope of the present invention which will be limited only by the appended claims.

It must be noted that as used herein and in the appended claims, the singular forms "a," "an," and "the" include plural referents unless the context clearly dictates otherwise. Thus, for example, reference to "a composition" includes mixtures of different composition, reference to "an inhibiting agent" can include one or more of such agents, and reference to "a method of production" include reference to equivalent steps and methods known to those skilled in the art, and so forth.

Unless defined otherwise, all foodstuff terms used herein have the same meaning as commonly understood by one of ordinary skill in the art to which this invention belongs. Although any methods and materials similar or equivalent to those described herein can be used in the practice or testing of the invention, the preferred methods and materials are now described. All publications mentioned herein are incorporated herein by reference to describe and disclose specific information for which the reference was cited in connection with.

Any publications discussed above are provided solely for their disclosure prior to the filing date of the present application. Nothing herein is to be construed as an admission that the invention is not entitled to antedate such disclosure by virtue of prior invention.

The term nonfat as used herein in regards to a nonfat spreadable protein composition or foodstuffs made therefrom means a composition whose fat content is less than 10%, preferably less than 5%, and most preferably less than 3%. All percentages described herein are percentages of total weights of the composition unless mentioned otherwise.

Nonfat solids that can be used in the spreadable nonfat protein composition of the present invention include any defatted nut particles such as milled: peanuts, hazelnuts, walnuts, sunflower seeds, cashews, sesame seeds, pumpkin seeds, almonds, pine nuts, macadamia nuts, any edible nut or any combination thereof; also included are milk protein, soy protein, rice protein or any combination thereof. The nonfat solid comprises in the range of about 20% to about 55% of the total percentage of the spreadable nonfat protein composition.

The fiber source of the nut and seed spread can be utilized to provide a high fiber contribution per serving size, while reducing the fat.

Sweetening agents, such as a liquid sweetener or sweetener combined with water can be used in the spreadable nonfat protein composition of the present invention. Particular sweetening agents that can be used include sugar, liquid honey, beet sugar, sucrose, corn syrup, fructose, maltose, dextrose, high fructose corn syrup, mannitol, cane sugar, brown sugar, sorbitol, unrefined cannery sugar, molasses, maple syrup, or any combination thereof. The total amount of sweetener used is in the range of about 40% to about 80% of the total percentage of the composition. More preferably the total amount of sweetener used range is about 50% to 70% and most preferably the range is about 60% to 65%. A sweetness inhibiting agent is used to prevent the perception of too much sweetness when using sweeteners in the range prescribed in the present invention. A preferred sweetness inhibiting amount of the sweetness inhibiting agent used herein has been determined to be in the range of about 0.1 % to about 4.0%. In a preferred embodiment, the sweetness inhibiting agent is (±)2-(4-methoxyphenoxy)-propanoate or salts thereof. The chemical (±)2-(4-methoxyphenoxy)-propanoate, the sodium salt is known as Lactisole, is also known under the trademark name Envision™ by the Domino Sugar Company.

Lactisole is a novel compound that contributes to the flavor balance of foods. Lactisole is synthesized chemically, however, the free acid, (±)2-(4-methoxyphenoxy) propanoic acid occurs naturally in coffee beans. Papers detailing the methodology and evidence for the natural occurrence have been published in the Journal of Agriculture and Food Chemistry (Rathbone, E. B. et al., Occurance of 2-(4-methoxyphenoxy) propanic acid in roasted coffee beans, J. Agric. Fd. Chem. 37(1):54–58 (1989), and Rathbone, E. B. et al., Chirality of 2-(4-methoxyphenoxy) propanoic acid in roasted coffee beans, J. Agric. Fd. Chem. 37(1):58–60 (1989). These papers have been reviewed by the International Organization of the Flavor Industry (IOFI) and both the free acid and the sodium salt (Lactisole) have been accorded nature-identical status. Extensive studies have shown Lactisole is stable to normal food manufacturing processes. Lactisole's properties were discovered and patented in U.S. Pat. No. 5,045,336. The simple aromatic carboxylic acid structure of Lactisole is similar to many flavoring agents that are permitted for use in foods worldwide, and which in some cases have been consumed for many centuries. Lactisole has been subjected to a comprehensive safety evaluation programme which took account of its chemical structure and proposed use in food. This safety evaluation programme has confirmed that Lactisole is safe for use in food at the levels proposed in the present application.

Additional or optional ingredients including natural and/or artificial flavors can be added to the spreadable nonfat protein composition. These colorings, seasonings, preservatives, flavorings, and the like may be added in the range of about 0.5% to about 25% to make particular nonfat edible foodstuffs such as: peanut butter, hazelnut/chocolate spreads, butter-like spreads, cheese spreads, cracker dips, dressings and the like. Flavorings may be obtained from any suppliers known to those in the art such as Cumberland Packaging or Kraft Cheeses.

For example, when making a nonfat butter, nonfat milk rather than peanut flour is used as the protein component of the composition. Butter flavorants are added to produce a nonfat butter. When making a hazelnut/chocolate spread, milk protein replaces the peanut flour and a 2:1 ratio of hazelnut powder to defatted chocolate is added as a flavorant. Likewise for cheese spreads, milk, soy or rice protein is substituted for the nonfatted flour while various cheese flavorings are added to generate the resulting cheese spread. Flavorants can also be added to the peanut butter spreads during the milling of the peanut flour to provide flavored peanut spreads. Other sample flavorings that can be added to the nonfat protein spread compositions are listed in Table 1.

TABLE 1

| TYPE | SUPPLIER |
| --- | --- |
| Cheddar Cheese | Mid America Farms #3536 |
| Nacho cheese | Heller #B2066 |
| Smoke Flavored | Baldmore Spices #SN38213 |
| Maple Flavored | Mother Murphy's #7203 |
| Banana | Mother Murphy's #378 |
| Cocoa Powder | Bd & F Man 10/12 Alkalized* |

*Cocoa Powder is sometimes but not always Alkalized.

Peanut butter flour or other defatted flours can be used in the spreadable nonfat protein composition of the present invention. Peanut butter flour comprises milled defatted peanut particles that can be produced by any method commonly known to those in the art. Methods for extracting peanut oil from peanuts are well known. U.S. Pat. No. 3,947,599 to Mitchell, for instance, describes a method for making fully defatted or partially defatted flavorless shelf stable peanut particles (flakes) or flour by forming an aqueous mix of finely ground raw peanuts, drying the mix into a thin stratum and extracting the oil with a solvent, such as hexane. Peanuts may also be partially or fully defatted by extraction with supercritical carbon dioxide. Low fat peanut flour are prepared by pressing and then milling ether raw or roasted peanuts as described in U.S. Pat. Nos. 3,947,599 and 4,113,889. The defatted peanut butter flour can comprise milled peanuts, hazelnuts, walnuts, sunflower seeds, cashews, milk protein, soy beans, any edible nut or any combination thereof As used herein, the term "peanut flour" means a fully defatted peanut material having less than 1% peanut oil. A typical commercially available defatted peanut flour will have an analysis of about 40% protein, 30% fat, 2.5% fiber, 19% carbohydrates, and the balance water. A whitening agent, titanium dioxide in the range of about 0.1% to about 2.0% is added only to the nut butter compositions of the present invention to prevent darkening as they age.

Salt is also present in the spreadable nonfat protein composition in the range of about 1.5% to about 40% of the total weight of the composition.

The water content of the composition is preferably less than about 4% by weight and the water activity (according to standard measures) is preferably less than about 7.5 water activity. The pH of the composition is neutral, in the range of about 6.8 to 7.4 pH.

Table 2 illustrates a preferred embodiment of the spreadable nonfat protein composition of the present invention. All the edible foodstuffs described herein are variants from this basic composition differing primarily in the type of edible protein employed (i.e., milk protein, rice protein, soy protein or defatted nut flour) and the types of flavorings or seasonings added (e.g., butter-like, cheese, chocolate, ect.).

TABLE 2

Spreadable Nonfat Protein Composition

| Ingredient | Percentage |
| --- | --- |
| Manitol Syrup | 52.7% |
| Defatted protein | 28.5% |
| Envision ™ | 13.7% |
| Glycerine | 2.1% |
| Salt | 1.5% |
| Flavoring | 0.9% |
| *FoodGlu ™ (Optional) | 0.26% |

*"FOODglu" is made from three GRAS ingredients, Rice, Konjac (yarn root) and Gellen Gum. It has the ability to bind foods together while giving them the mouth feel of fat. The label should read "Rice, Konjac (yam root)." (The Gellen Gum is used as a processing aid). It is FDA and USDA-approved for use in all types of foods including meat and poultry. FOODglu is synergistic with a great many additives, including gums such as xanthan, carrageenan, guar, locust bean, and cellulose, plus protein isolates, hydrolyzed starch, etc. The addition of one or more of these items to FOODglu can give a thicker viscosity or even a gel quality if needed in the chosen application. To produce a rigid gel, a very small amount of alkaline material, such as sodium carbonate or biocarbonate can be added to enhance the jelling properties as the pH is raised.

The following examples illustrate methods of making various nonfat foodstuffs using the spreadable nonfat protein composition of the invention. Other methods are contemplated and will be known to those in the art as long as they adhere to the compositions indicated herein.

EXAMPLE 1

NONFAT PEANUT SPREAD

The following example illustrates a nonfat peanut spread made using the spreadable nonfat protein composition of the present invention.

To be labeled "peanut butter" under the applicable regulations of the United States Food and Drug Administration, the peanut ingredients must comprise at least 90% of the weight of the finished product, 21 C.F.R. §164.150. If more than 10% of the peanut product consists of non-peanut ingredients, then the product may be termed a "peanut spread," 21 C.F.R. §102.23(a) so long as it meets all of the conditions set forth in 21 C.F.R. §102.23 (b). One of these conditions is that the protein content of the product is at least 24% by weight of the finished product.

Nonfat peanut flour (obtained either commercially or produced according to the methods known in the art) is rehydrated and is fed into a suitable mill. The milling operation continues until the maximum particle size of the flour is reduced to less than about 200 microns in diameter. Particles larger than about 200 microns produce a gritty feel in the mouth that most consumers find unpleasant and not characteristic of conventional peanut butter. Additional milling will produce a smoother texture and in fact, a maximum particle size of 150 microns is more desirable, and a maximum size of no more than about 75 microns is most preferred.

The finely ground and blended ingredients do not require any additional cooking as the peanuts are roasted before being defatted and processed.

When the desired texture has been reached, the peanut butter product may be conveyed to processing equipment for shelf stable packaging. At this stage the peanut butter-like product has a desirable peanut taste characteristic, texture similar to that of peanut butter. It also has a fat content that is greatly reduced (by as much as 80–95%) below the fat content of conventional peanut butter.

Table 3 demonstrates a suitable formula to achieve a nonfat peanut butter foodstuff using the spreadable nonfat protein composition of the present invention.

TABLE 3

| Ingredient | Fully Fat Reduced |
| --- | --- |
| Manitol Syrup | 52.7% |
| Defatted peanut flour | 28.5% |
| Envision ™ | 13.7% |
| Glycerine | 2.1% |
| Salt | 1.5% |
| Flavoring | 0.9% |
| FoodGlu ™ | 0.26% |
| Titanium Dioxide | .05% |
| TOTAL | |

A content analysis of a sample of the peanut butter of example 1 was conducted by Food Products Laboratory, Inc. of Portland Oreg. The results of the analysis are presented in table 4.

TABLE 4

| Ingredient | | | | | |
| --- | --- | --- | --- | --- | --- |
| Water | 16.45 | mg | 5.265 | g | nd.* |
| Total Vit A | 0.0 | RE | 0.0 | RE | 0.0% |
| A-Retinol | 0.0 | RE | 0.0 | RE | 0.0% |
| A-Carotenoid | 0.0 | RE | 0.0 | RE | 0.0% |
| Thiamin-B1 | 0.0 | mg | 0.0 | mg | 0.0% |
| Riboflavin-B2 | 0.0 | mg | 0.0 | mg | 0.0% |
| Niacin-B3 | 0.0 | mg | 0.0 | mg | 0.0% |
| Niacin Eguiv. | 0.0007 | mg | 0.0002 | mg | 0.0% |
| Vitamin B6 | 0.0 | mg | 0.0 | mg | 0.0% |
| Vitamin B12 | 0.0 | mg | 0.0 | mg | 0.0% |
| Folate | 0.0 | mg | 0.0 | mg | 0.0% |
| Pantothenic | 0.0 | mg | 0.0 | mg | 0.0% |
| Vitamin C | 0.0 | mg | 0.0 | mg | 0.0% |
| Vitamin D | 0.0 | mg | 0.0 | mg | 0.0% |

TABLE 4-continued

| Ingredient | | | | | |
|---|---|---|---|---|---|
| Vit E-Alpha Eq. | 0.0 | mg | 0.0 | mg | 0.0% |
| Calcium | 0.9083 | mg | 0.2907 | mg | 0.0% |
| Copper | 0.0006 | mg | 0.0002 | mg | 0.0% |
| Iron | 0.0287 | mg | 0.0092 | mg | 0.1% |
| Magnesium | 0.0402 | mg | 0.0129 | mg | 0.0% |
| Manganese | 0.0024 | mg | 0.0008 | mg | nd. |
| Phosphorus | 0.0001 | mg | 0.0 | mg | 0.0% |
| Potassium | 0.1801 | mg | 0.0576 | mg | 0.0% |
| Selenium | 0.0605 | mg | 0.0194 | mg | nd. |
| Sodium | 773.7 | mg | 247.6 | mg | 10.3% |
| Zinc | 0.0 | mg | 0.0 | mg | 0.0% |
| Alcohol | 0.0 | g | 0.0 | g | 0.0% |
| Caffeine | 0.0 | mg | 0.0 | mg | 0.0% |

*nd. = not determined

The analysis concluded that the nonfat peanut butter had a total fat content of 1.3% and a level of water activity of 0.759.

Additionally, a nutritional analysis was conducted. The results are presented in Table 5.

TABLE 5

NUTRITION FACTS

Serving Size (32 g)
Servings per Container
Amount Per Serving
Calories 100    Calories from Fat    0

| | % Daily Value* |
|---|---|
| Total Fat 0 g | 1% |
| Saturated Fat 0 G | 0% |
| Cholesterol 0 mg | 0% |
| Sodium 250 mg | 10% |
| Total Carbohydrate 20 g | 7% |
| Dietary Fiber 2 g | 7% |
| Sugars 16 g | |
| Protein 5 g | |
| Vitamin A 0% - Vitamin C 0% - Calcium 2% - Iron 2% | |

*Percentages (%) of a Daily Value are based on a 2,000 calorie diet. Individual Daily Values may vary higher or lower depending on caloric requirements:

| Nutrient | | 2000 Calories | 2500 Calories |
|---|---|---|---|
| Total Fat | Less than | 65 g | 80 g |
| Sat Fat | Less than | 20 g | 25 g |
| Cholesterol | Less than | 300 g | 300 g |
| Sodium | Less than | 2400 g | 2400 g |
| Total Carbohydrate | | 300 g | 375 g |
| Fiber | | 25 g | 30 g |

1 g Fat = 9 calories
1 g Carbohydrates = 4 calories
1 g Protein = 4 calories

INGREDIENTS:

| | |
|---|---|
| Tru-Sweet 55 High Fructose Corn SyrupAMZ | 21.29 g |
| Toasted, Defatted Peanut Flour | 9.05 g |
| Sweetness inhibitor (Lactisole) | 0.7985 g |
| Salt | 0.6388 g |
| N & A Roasted Peanut Flavor (VDF) | 0.1065 g |
| Natural Peanut Flavor concentrate (VDF) | 0.1065 g |
| Titanium Dioxide WJ | 0.0064 g |

EXAMPLE 2

NONFAT BUTTER

A nonfat butter-like spread is created according to the same method as the non fat peanut butter in Example 2, except that milk protein replaces the peanut flour protein and the peanut whitening agent, titanium dioxide is not used.

EXAMPLE 3

NONFAT CHOCOLATE/HAZELNUT SPREAD

A nonfat chocolate/hazelnut spread (similar to the spread marketed under the trade name Nuttella™) is created according to the same formula as the non fat peanut butter in Example 2, except that milk protein replaces the peanut flour protein, the peanut whitening agent titanium dioxide is not used and a flavoring of hazelnut powder:defatted chocolate in the ratio of 2:1 is added.

EXAMPLE 4

NONFAT CHEESE SPREAD

A nonfat cheese spread is created according to the same formula as the non fat peanut butter in Example 2, except that milk protein replaces the peanut flour protein, the peanut whitening agent titanium dioxide is not used and a cheese flavoring is added.

Although the invention has been described with reference to the presently preferred embodiment, it should be understood that various modifications can be made without departing from the spirit of the invention. Accordingly, the invention is limited only by the following claims.

What is claimed is:

1. A spreadable (nonfat) protein composition comprising: an edible, protein-containing nonfat solid present from about 20% to 55% of the total weight of the composition; wherein the nonfat solid comprises defatted flour made from components selected from the group consisting of milled peanuts, milled hazelnuts, milled walnuts, milled sunflower seeds, milled cashews, milk protein, soy protein and rice protein and any edible nut or any combination thereof;

a sweetener present in an amount of about 40% to 80% of the total weight of the composition; and a sweetness-inhibiting amount of (±) 2-(4-methoxyphenoxy)propanoate salts, wherein the composition has less than about 10 percent fat by weight.

2. The composition of claim 1, wherein the sweetener is in the range of about 50% to 70% percent of total weight of the composition.

3. The composition of claim 1, wherein the sweetener is in the range of about 60% to 65% percent of total weight of the composition.

4. The composition of claim 1, wherein the nonfat solid comprises defatted flour, milk protein, soy protein or rice protein or any combination thereof.

5. The composition of claim 1, wherein the composition has less than about 5 percent fat by weight.

6. The composition of claim 1, wherein the composition has less than about 3 percent fat by weight.

7. The composition of claim 1, wherein the sweetener is selected from the following group consisting of: sucrose, mannitol, cane sugar, sorbitol, unrefined cannery sugar, honey, maltose, molasses, and maple syrup or any combination thereof.

8. The composition of claim 7, wherein the natural and/or artificial flavors are in the range of about 0.5% to 25% of total weight of the composition.

9. The composition of claim 7 wherein the salts are in the range of about 5% to 40% percent of total weight of the composition.

10. The composition of claim 1, wherein the sweetness inhibiting agent is in the range of about 0.01% to 4.0% percent of total weight of the composition.

11. The composition of claim 1, further comprising natural and/or artificial flavors and/or salts.

12. The composition of claim 1, wherein the spreadable nonfat protein composition is a nonfat peanut butter.

13. The composition of claim 1, wherein the spreadable nonfat protein composition is a nonfat cheese spread.

14. The composition of claim 1, wherein the spreadable nonfat protein composition is a nonfat butter.

15. The composition of claim 1, wherein the spreadable nonfat protein composition is a nonfat dressing.

16. The composition of claim 1, wherein the spreadable nonfat protein composition is a nonfat chocolate/hazelnut spread.

17. The composition of claim 1, wherein the spreadable nonfat protein composition is a nonfat dip.

18. The composition of claim 1, further comprising titanium dioxide present in an amount of less than 2% by weight.

* * * * *